> Patented Feb. 24, 1953

UNITED STATES PATENT OFFICE 2,629,736

BASICALLY SUBSTITUTED N-ALKYL DERIVATIVES OF α,β,β-TRIARYLPROPIONAMIDES

Carl Peter Krimmel, Mundelein, Ill., assignor to G. D. Searle & Co., Chicago, Ill., a corporation of Illinois No Drawing. Application February 24, 1951, Serial No. 212,680

12 Claims. (Cl. 260—558)

The present invention is concerned with a new type of amide of α,β,β-triarylpropionic acids and salts thereof. In particular it is concerned with basically substituted N-alkyl derivatives of α,β,β-triarylpropionamides of the structural formula

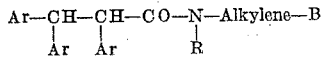

wherein Ar represents an aryl radical, R is a member of the class comprising hydrogen and aryl radicals, and B is a member of the class comprising dialkylamino radicals and saturated nitrogen-containing heterocyclic radicals attached to the alkylene radical through a nitrogen in the heterocycle. In the foregoing structural formula, Ar may represent such aryl groups as phenyl, ortho-, meta-, and paratolyl, ortho-, meta-, and para-anisyl and the like. The radical R is an aryl group of the same type or hydrogen. The alkylene group represents a bivalent, saturated, aliphatic hydrocarbon radical of from two to eight carbon atoms; this radical is derived from a straight-chain or branched-chain aliphatic hydrocarbon and includes radicals such as ethylene, propylene, butylene, amylene, or polymethylene radicals such as trimethylene, tetramethylene, pentamethylene, and hexamethylene. The radical B may be a dialkylamino radical of the type

wherein R and R' represent such lower alkyl radicals as methyl, ethyl, propyl, butyl, amyl, and hexyl and wherein the propyl, butyl, amyl, and hexyl radicals may be either of the straight-chain or branched-chain type. The radical B may also be a saturated nitrogen-containing heterocyclic radical attached to the alkylene radical as indicated hereinabove and such heterocyclic radicals as piperidine, lupetidine, pyrrolidine, morpholine, thiamorpholine, piperazine, and N'-alkylpiperazine are within the scope of the invention.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of the sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzene sulfonate, ethyl toluene sulfonate, ethylene chlorohydrin, propylene chlorohydrin, allyl bromide, methallyl bromide and crotyl bromide.

The object of this invention is to provide novel amides of α,β,β-triarylalkanoic acids. Certain of these amides are valuable intermediates in organic synthesis. Others have been found to possess a number of useful pharmacodynamic properties. Thus they have a pronounced effect on the cardiovascular and renal excretory function. They are active spasmolytics as demonstrated by their effects in abolishing spasms of the gastrointestinal sytem which may be induced by acetylcholine, barium chloride or histamine.

The amides of this invention are conveniently prepared by heating the acid halide of an α,β,β-triarylpropionic acid with a basically substituted alkylamine of the type

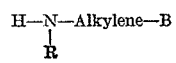

wherein B and R are defined as hereinabove.

My invention is disclosed in further detail by the following examples which are set forth for the purpose of illustrating this invention and which are in no way to be construed as limiting the invention in spirit or in scope. It will be apparent to those skilled in the art that many conventional modifications in methods, conditions, and materials can be adopted without departing therefrom.

In the examples the temperatures are given uncorrected in degrees centigrade (°C.), the parts by weight in grams (g.), the parts by volume in milliliters (ml.), and the pressures in millimeters (mm.) of mercury.

EXAMPLE 1

α,β,β-triphenylpropionyl chloride

The acid chloride of α,β,β-triphenylpropionic acid is prepared in a form suitable for carrying out the reactions herein described according to the following method.

A mixture of 60 g. of α,β,β-triphenylpropionic acid, 60 ml. of thionyl chloride, and 300 ml. of carbon tetrachloride is refluxed on the steam bath for 3 hours. The excess of the volatile reagents is removed by vacuum distillation on the steam bath. The residual acid chloride is used without further purification.

EXAMPLE 2

N-(β-diethylaminoethyl)-α,β,β-triphenylpropionamide

The acid chloride residue obtained from 51 g. of α,β,β-triphenylpropionic acid is dissolved in 1000 ml. of anhydrous ethyl ether and 20 g. of 2-diethylaminoethylamine are added dropwise with stirring. The resultant gummy precipitate is extracted with water. The water extract is separated, made alkaline with sodium hydroxide and ether extracted. The extract is dried over anhydrous potassium carbonate and filtered. The solid residue which remains after the ether is stripped from the filtrate is recrystallized from petroleum ether to yield the desired basic amide which has the structural formula

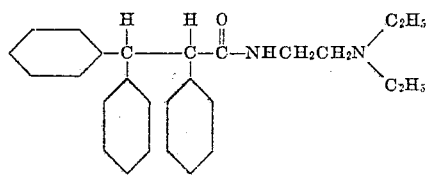

A solution of 10 g. of N-(β-diethylaminoethyl)-α,β,β-triphenylpropionamide in 1000 ml. of anhydrous ethyl ether is treated with an equivalent of a 10% solution of hydrogen chloride in anhydrous isopropanol. The flocculent hydrochloride precipitate is suction filtered, ether washed, and dried in a vacuum desiccator. The hydrochloride is recrystallized from toluene and a white crystalline, water-soluble product having a melting point of 185–187° C. is obtained.

EXAMPLE 3

N-(γ-dimethylaminopropyl)-α,β,β-triphenylpropionamide

The acid chloride residue obtained from 40 g. of α,β,β-triphenylpropionic acid is dissolved in 1000 ml. of anhydrous ethyl ether. To this solution 13 g. of 3-dimethylaminopropylamine are added dropwise at such a rate as to prevent excessive reflux. A gummy cream colored precipitate is formed. It is dissolved in an equivalent of hydrochloric acid in 1000 ml. of water. The acid solution is ether washed, separated and made alkaline with sodium hydroxide. An orange oil is released, and this is allowed to cool and solidify. The solid is broken up, washed free of alkali with water, and dried. It may be further purified by recrystallization from petroleum ether.

To a solution of 10 g. of N-(γ-dimethylaminopropyl)-α,β,β-triphenylpropionamide dissolved in 1000 ml. of anhydrous ethyl ether is added an equivalent of a 10% solution of hydrogen chloride gas in anhydrous isopropanol. The base hydrochloride is precipitated as a fine white powder which after suction filtration, ether washing, and drying in a vacuum desiccator weighs 8.6 g. At room temperature this material dissolves rapidly in 50 ml. of butanone and almost immediately recrystallizes to give a quantitative recovery of a white, crystalline, non-hygroscopic, water-soluble hydrochloride melting at 203–206° C.

EXAMPLE 4

N-(γ-diethylaminopropyl)-α,β,β-triphenylpropionamide

To a stirred solution of the acid chloride residue obtained from 80 g. of α,β,β-triphenylpropionic acid in 1000 ml. of anhydrous ethyl ether are added 34 g. of 3-diethylaminopropylamine. The rate of addition is limited only by the need to prevent excessive reflux.

The resultant gummy precipitate is dissolved by shaking the reaction mixture with dilute hydrochloric acid. The acid layer is separated, made alkaline with sodium hydroxide, and ether extracted. The ether extract is dried over anhydrous potassium carbonate, filtered, and ether stripped on the steam bath. Upon cooling, the desired base is obtained as a pale orange solid which may be further purified by crystallization from petroleum ether and treatment with decolorizing carbon.

A solution of 30 g. of N-(γ-diethylaminopropyl)-α,β,β-triphenylpropionamide in 3000 ml. of anhydrous ethyl ether is treated with an equivalent of hydrogen chloride gas as a 10% solution in anhydrous isopropanol. The resultant white precipitate is suction filtered, ether washed, and dried in a vacuum desiccator to give a hygroscopic powder. This material is recrystallized by dissolving it in 200 ml. of warm butanone, cooling, and scratching. Filtration and air drying yield a white, crystalline, water-soluble product having a melting point of 184–186° C.

EXAMPLE 5

N-(α-methyl-δ-diethylaminobutyl)-α,β,β-triphenylpropionamide

To a stirred solution of the acid chloride residue obtained from 60 g. of α,β,β-triphenylpropionic acid in 300 ml. of acetone are added 32 g. of 5-diethylamino-2-aminopentane over a period of 15 minutes. The reaction mixture is refluxed for 3 hours, and the acetone is stripped on the steam bath under vacuum. The residue is taken up in hot water, cooled, and ether extracted. The aqueous layer is separated, made alkaline with sodium hydroxide and ether extracted. The extract is dried over anhydrous potassium carbonate, filtered, and ether stripped. Vacuum distillation of the residue gives a pale yellow, viscous syrup boiling at 260–263° C. and 2.5 mm. pressure.

The hydrochlorides of the two racemic N-(α-methyl-δ-diethylaminobutyl)-α,β,β-triphenylpropionamides are obtained by cooling the above reaction mixture prior to acetone stripping, in which case the hydrochlorides crystallize directly from solution. The hydrochlorides are also obtained by precipitating the base from an ethereal solution with hydrogen chloride-isopropanol solution. Successive recrystallizations of the precipitate using butanone and ethyl acetate yield white, water-soluble crystals melting at 178–181° C. N-(α-methyl-δ-diethylaminobutyl)-α,β,β-triphenylpropionamide has the formula

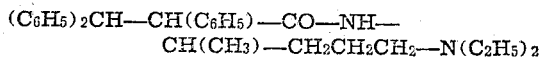

EXAMPLE 6

N-[β-(4-morpholino)ethyl]-α,β,β-triphenylpropionamide

The acid chloride residue obtained from 60 g. of α,β,β-triphenylpropionic acid is dissolved in 300 ml. of acetone. To this solution 28 g. of aminoethylmorpholine are added dropwise at such a rate as to prevent excessive reflux. Following the addition, the reaction mixture is refluxed for 2 hours and stripped of acetone by vacuum distillation on the steam bath. The residue is taken up in 500 ml. of hot water. Upon cooling, crystals separate from the aqueous solution, and these are suction filtered, ether washed, and air dried. In this manner a pale orange, crystalline powder is obtained which may be further purified by successive recrystallization from butanone and anhydrous isopropanol to yield a white, crystalline product melting at about 224–234° C. and soluble in warm water. The structure was confirmed by the following analytical data:

Cl: Calculated 7.86; Found 7.89.
N: Calculated 6.21; Found 6.13.
C: Calculated 71.90; Found 71.98.
H: Calcualted 6.93; Found 6.98.

The formula of the hydrochloride is

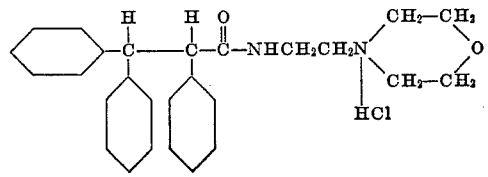

EXAMPLE 7

N-(β-diethylaminoethyl)-α,β,β-triphenyl-propionanilide

The acid chloride residue obtained from 60 g. of α,β,β-triphenylpropionic acid is dissolved in 300 ml. of acetone. With stirring 38.5 g. of N,N-diethyl-N'-phenylethylenediamine are added over a period of 15 minutes. The reaction mixture is refluxed for 3 hours, the acetone is stripped on the steam bath under vacuum, and the residue is taken up in water. After ether extraction to remove organic impurities, the aqueous layer is separated, made alkaline with sodium hydroxide, and ether extracted. The extract is separated, dried over anhydrous potassium carbonate, filtered, and ether stripped. Vacuum distillation of the residue yields a colorless, viscous, water-insoluble base boiling at about 252–263° C. at 1 mm. pressure. The N-(β-diethylaminoethyl)-α,β,β-triphenylpropionanilide may be solubilized by warming with an equivalent of 10% aqueous citric acid solution. It has the structural formula

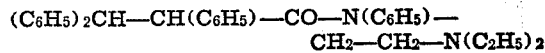

I claim:

1. The new group of organic compounds consisting of the bases of the structural formula

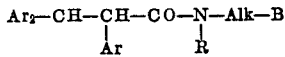

and salts thereof, wherein Ar is a monocyclic aromatic hydrocarbon radical, R is a member of the class consisting of hydrogen and phenyl radicals, Alk is a lower alkylene radical containing at least two carbon atoms, and B is a member of the class consisting of lower dialkylamino, morpholino, piperidino and pyrrolidino radicals.

2. N-dialkylaminoalkyl derivatives of α,β,β-triphenylpropionamide of the structural formula

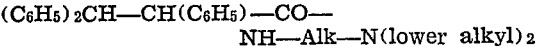

wherein Alk is a lower alkylene radical containing at least two carbon atoms.

3. Lower N-dialkylaminoethyl-α,β,β-triphenylpropionamides of the structural formula

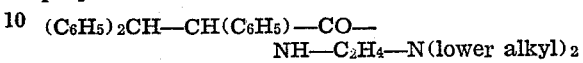

4. N-(β-diethylaminoethyl)-α,β,β-triphenylpropionamide.

5. Lower N-dialkylaminopropyl-α,β,β-triphenylpropionamides of the structural formula

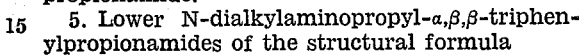

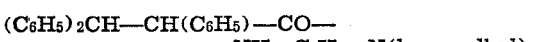

6. Lower N-dialkylaminobutyl-α,β,β-triphenylpropionamides of the structural formula

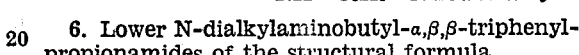

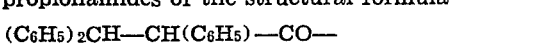

7. N-diethylaminobutyl-α,β,β-triphenylpropionamides.

8. Lower N-dialkylaminoamyl-α,β,β-triphenylpropionamides of the structural formula

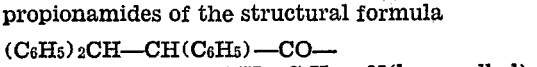

9. N-diethylaminoamyl-α,β,β-triphenylpropionamides.

10. N-dialkylaminoalkyl derivatives of α,β,β-triphenylpropionanilides which are represented by the structural formula

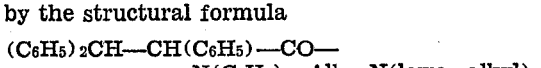

wherein Alk is a lower alkylene radical containing at least two carbon atoms.

11. N-(β-diethylaminoethyl)-α,β,β-triphenylpropionanilide.

12. N-(γ-diethylaminopropyl)-α,β,β-triphenylpropionamide.

CARL PETER KRIMMEL.

REFERENCES CITED

The following references are of record in the file of this patent:

FOREIGN PATENTS

| Number | Country | Date |
|---|---|---|
| 182,893 | Switzerland | June 2, 1936 |

OTHER REFERENCES

Shriner et al., Chem. Abstracts, vol. 32, p. 6640 (1938).